United States Patent [19]

Smith et al.

[11] Patent Number: 5,422,216
[45] Date of Patent: Jun. 6, 1995

[54] DEVELOPER COMPOSITION AND METHOD OF PREPARING THE SAME

[75] Inventors: Danny R. Smith; James N. Kaiser, both of Chattanooga, Tenn.

[73] Assignee: Steward, Chattanooga, Tenn.

[21] Appl. No.: 204,611

[22] Filed: Mar. 1, 1994

[51] Int. Cl.$^6$ .............................................. G03G 9/10
[52] U.S. Cl. ................................... 430/108; 430/106.6
[58] Field of Search ............................... 430/108, 106.6

[56] References Cited

U.S. PATENT DOCUMENTS

| | | | |
|---|---|---|---|
| 2,618,552 | 11/1952 | Wise | 95/1.9 |
| 2,846,333 | 8/1958 | Wilson | 117/17.5 |
| 2,874,063 | 2/1959 | Greig | 117/17.5 |
| 3,079,342 | 2/1963 | Insalaco | 252/62.1 |
| 3,099,943 | 8/1963 | Eichorn et al. | 95/1.7 |
| 3,590,000 | 6/1971 | Palermiti et al. | 252/62.1 |
| 3,900,587 | 8/1975 | Lenhard et al. | 427/19 |
| 3,929,657 | 12/1975 | Jones | 252/62.1 P |
| 3,989,648 | 11/1976 | Lenhard et al. | 252/62.1 P |
| 4,075,391 | 2/1978 | Berg et al. | 430/108 |
| 4,192,902 | 3/1980 | Lu | 427/127 |
| 4,618,556 | 10/1986 | Takenouchi | 430/110 |
| 4,623,603 | 11/1986 | Iimura et al. | 430/108 |
| 4,663,262 | 5/1987 | Oka et al. | 430/108 |
| 4,698,289 | 10/1987 | Aldrich et al. | 430/106.6 |
| 4,741,984 | 5/1988 | Imai et al. | 430/106.6 |
| 4,751,164 | 6/1988 | Katayama et al. | 430/137 |
| 4,822,708 | 4/1989 | Machida et al. | 430/106.6 |
| 4,855,205 | 8/1989 | Saha et al. | 430/106.6 |
| 4,879,198 | 11/1989 | Tavernier et al. | 430/106.6 |
| 4,898,801 | 2/1990 | Tachibana et al. | 430/106.6 |
| 4,937,166 | 6/1990 | Creatura et al. | 430/108 |
| 4,971,880 | 11/1990 | Hotomi et al. | 430/108 |
| 5,004,665 | 4/1991 | Ohtani et al. | 430/106.6 |
| 5,116,711 | 5/1992 | Kobayashi et al. | 430/106 |
| 5,124,223 | 6/1992 | Yoerger | 430/106.6 |
| 5,149,610 | 9/1992 | Kobayashi et al. | 430/106 |
| 5,162,187 | 11/1992 | Lyons et al. | 430/106.6 |
| 5,180,649 | 1/1993 | Kukimoto et al. | 430/106.6 |
| 5,194,356 | 5/1993 | Sacripante et al. | 430/106.6 |
| 5,204,204 | 4/1993 | Shintani et al. | 430/108 |
| 5,206,109 | 4/1993 | Anno | 430/137 |
| 5,212,034 | 5/1993 | Tsuyama et al. | 430/108 |
| 5,212,039 | 5/1993 | Demizu et al. | 430/122 |

*Primary Examiner*—John Goodrow
*Attorney, Agent, or Firm*—Bell, Seltzer, Park & Gibson

[57] ABSTRACT

A method for preparing the carrier for a developer composition is provided. The method comprises subjecting a ferric oxide and a metal oxide to conditions sufficient to form a ferrite have a spinel structure, mixing the ferrite having a spinel structure with a sintering agent, and sintering in the liquid phase the mixture at temperature conditions of less than about 1375° C. to provide a ferrite carrier devoid of zinc, copper, or nickel in its crystal structure. The ferrite carrier cab be used in a developer composition comprising the ferrite carrier and a toner composition.

23 Claims, No Drawings

DEVELOPER COMPOSITION AND METHOD OF PREPARING THE SAME

FIELD AND BACKGROUND OF THE INVENTION

The present invention relates to developer compositions for electrophotograhic copying, and more particularly to a method of preparing an improved developer composition.

Various methods of electrophotographic development are knowns. One of the more common techniques is the magnetic brush development method. The magnetic brush development method utilizes magnetic means associated with a developing mixture of a magnetic carrier (e.g., particles or powder) carrying a number of smaller electrostatically adhering toner particles. The developer composition is maintained during the development cycle in a loose, brush-like orientation by a magnetic field surrounding, for example, a rotatable non-magnetic cylinder having a magnetic means fixedly mounted inside. The magnetic carrier is attracted to the cylinder by the described magnetic field, and the toner particles are held to the carrier by virtue of their opposite electrostatic polarity. Before and during development, the toner acquires an electrostatic charge of a sign opposite to that of the carrier due to triboelectric charging derived from their mutual frictional interaction. When this brush-like mass of magnetic carrier with adhering toner particles is drawn across the photoconductive surface bearing the electrostatic image, the toner particles are electrostatically attracted to an oppositely charged latent image and form a visible toner image corresponding to the electrostatic image.

Ferrite cores have been widely used as the magnetic carrier material. There are several critical parameters which are necessary and must be controlled to produce a suitable ferrite carrier core. First, the particulate shape, size, and size distribution affect the carrier coating and its ability to hold toner, thereby producing good copy quality. The volume resistivity of the ferrite must also be established in a range which will be compatible with the coating to control the developer conductivity. To utilize the developer in a magnetic brush development process, the ferrite core must have adequate saturation magnetization to control its carrier function. Further, the apparent density of the carrier materially affects the volume in the developer charge and provides proper flow characteristics. Two of the most important properties are the surface area and the surface morphology of the core; these have a direct impact on the coating characteristics of the core which in turn affect the copy quality.

To produce the optimum carrier characteristics, ferrites of both cubic and hexagonal structures have been used. It is preferred with the magnetic brush two-component developers to use the cubic spinel structure of the form $MFe_2O_4$ or $(MO)_x(Fe_2O_3)_y$ where M is a metal selected from the group consisting of lithium, manganese, nickel, zinc, cadmium, copper, cobalt, iron, and magnesium such as described in U.S. Pat. No. 4,898,801 to Tachibana et al. Two of the most widely used systems are nickel zinc ferrite and copper zinc ferrite. Whereas these systems produce effective magnetic carriers, there is, however, growing concern regarding the environmental problems associated with the presence of various forms of nickel, zinc or copper such as found in the above carriers.

Other ferrites, are proposed, for example in U.S. Pat. No. 4,855,205 to Saha et al. Saha et al. proposes a two-phase cubic ferrite composition comprising 0.1 moles to 1.0 moles of a ferrite having the formula $MFe_2O_4$ where M is at least one element which forms a spinel ferrite (e.g., nickel, cobalt, magnesium, manganese, copper, zinc, and iron) and about 2.5 moles of a magnetoplumbite having the formula $R_xP_{1-x}Fe_2O_{19}$ where R is a rare earth and P is selected from the group consisting of strontium, barium, calcium and lead.

U.S. Pat. No. 5,004,665 to Ohtani et al. proposes a toner composition for electrophotographic copying comprising a resin, a colerant, and polymeric-magnetic coordination complex, poly-bis-(2,6-pyridinediylmethylidenenitrilohexamethylenenitrilomethylidene) iron sulfate.

U.S. Pat. No. 3,590,000 to Palermiti proposes carrier particles comprised of various cores including steel, with a coating of fluoropolymers, and terpolymers of styrene, methacrylate, and silane compounds.

U.S. Pat. No. 5,162,187 to Lyons et al. proposes a carrier composition comprised of a semiconductive ferrite core with a coating of a mixture of first and second polymers that are not in close proximity in the triboelectric series (e.g., polystyrene and tetrafluoroethylene). At column 5, lines 4 through 14, a specific semiconductive ferrite core comprising magnesium copper zinc available from the assignee of the present invention, Steward, Inc., is described.

Other ferrite carriers are proposed in U.S. Pat. Nos. 2,846,333 to Wilson; 3,929,657 to Jones; and 4,127,667 to Jones.

Despite the general availability of ferrite carriers and various methods of producing and using them, there continues to be a desire for improvements in carrier performance. For example, it is an object to provide higher volume resistivity and a wider range of saturation magnetization. It is also an object to eliminate or reduce the use of ferrites having forms of nickel, zinc, and copper. These metals have come under increased scrutiny by regulatory agencies, and materials including these metals often require special, and typically expensive, disposal methods. It is a further object to produce a suitable ferrite carrier inexpensively and efficiently.

SUMMARY OF THE INVENTION

These and other objects, features and advantages are achieved by the method of the present invention relating to preparing a ferrite carrier for a developer composition. The carrier is devoid of zinc, copper, or nickel in its crystal structure. Moreover, the ferrite carrier has a high volume resistivity and a wide range of saturation magnetization.

The method comprises subjecting a ferric oxide and a metal oxide (e.g., manganese oxide or ferrous oxide) to conditions sufficient to form a ferrite have a spinel structure, mixing the ferrite having a spinel structure with a sintering agent, and sintering in the liquid phase the mixture at temperature conditions of less than about 1375° C. to provide a ferrite carrier devoid of zinc, copper, or nickel in its crystal structure. Sintering in the presence of a liquid phase (i.e., "liquid phase sintering") is a way of bonding two or more materials, e.g., manganese oxide and ferric oxide or ferrous oxide and ferric oxide (magnetite), which have different melting points, into dense bodies. The system remains multiphase throughout the entire process. Liquid phase sintering uses a material transport mechanism involving viscous flow and diffusion. The liquid phase sintering mechanism promotes reactions between particles so that the growth of grains is promoted.

In another embodiment, the present invention provides a developer composition comprising a toner composition and a ferrite carrier composition. The toner composition is typically a resin (e.g., a copolymer of styrene and acrylic acid) and a colorant. Preferably, the ferrite carrier composition comprises, in the primary phase, from about 10 to 45 percent by weight manganese oxide and from about 55 to 90 percent by weight ferric oxide, and in the intergranular phase from about 0.5 to 3 percent by weight bismuth trioxide. The developer composition of the present invention has suitable performance properties such as a volume resistivity about $1.0 \times 10^5$ to $3 \times 10^9$ ohm cm and a saturation magnetization of about 40 to 95 EMU/g. Moreover, the developer composition can be formed without potentially environmentally undesirable zinc, nickel and copper.

In another embodiment, the carrier compositions prepared by the method of the present invention can be coated to stabilize the resistivity and triboelectric characteristics such as described in U.S. Pat. No. 5,162,187 to Lyons et al.

DETAILED DESCRIPTION OF THE INVENTION

As summarized above, the present invention provides an improved carrier and a developer composition utilizing the carrier, and a method of preparing the same. The developer composition is particularly adapted for use in various elecrtrophotographic copying methods such as described in U.S. Pat. Nos. 2,618,552 to Wise, 2,874,063 to Greig, and 3,079,342 to Insalaco, the disclosures of which are incorporated herein by reference in their entirety. For example, the developer composition of the present invention can be used in the magnetic brush technique of developing wherein a developer composition is maintained during the development cycle in a brush-like composition by a magnetic field surrounding a rotatable nonmagnetic cylinder having a magnetic means fixedly mounted inside.

The carrier is prepared by forming a mixture of ferric oxide and a metal oxide. Exemplary metal oxides include oxides of manganese, iron, cobalt, lithium, magnesium and the like. The mixture is preferably pelletized to form a granulate. Water or other suitable liquids can be used to aid pelletization. The granulate is subjected to conditions sufficient to form a ferrite having a spinel structure. For example, the granulate is calcined in a rotary calciner at a temperature of about 900° C. to 1200° C. for about 10 to 30 minutes until spinel formation occurs. The saturation magnetization of the ferrite having a spinel structure (calcine) is about 10 to 60 EMU/g. The calcine is mixed with a sintering agent and with water or other suitable liquid, a dispersant, a defoamer and a binder agent.

The sintering agent is used as a flux. The sintering agent becomes a single liquid phase during the sintering. The metal oxide is dispersed in the ferric oxide through a mass transfer mechanism involving viscous flow and diffusion as will be known to those skilled in the art. Exemplary sintering agents include bismuth trioxide or any of the well known frit compositions. The sintering agent should have a melting temperature below that of the solids. An exemplary specific frit, Ferro Frit No. 3292 from Ferro Corporation, has the following composition:

| Compound | Mole % |
| --- | --- |
| $K_2O$ | 2.13 |
| $Na_2O$ | 3.16 |
| $Li_2O$ | 0.94 |
| $CaO$ | 12.01 |
| $MgO$ | 1.23 |
| $SrO$ | 2.96 |
| $Al_2O_3$ | 6.75 |
| $B_2O_3$ | 5.27 |
| $SiO_2$ | 65.55 |
| | 100% |

The mixture is milled using a ball mill or attrition mill to a size of about 1.41 to 1.65 μm. The mixture is dried using wheel atomization or the like to a specific particle size distribution. The spray dried mixture is sintered in the liquid phase in air at less than about 1375° C. for about 2 to 5 hours and then annealed in an inert atmosphere such as nitrogen for about 1 to 6 hours at about 1000° C. to 1100° C. The saturation magnetization of the sintered mixture is about 40 to 95 EMU/g. The sintered mixture is deagglomerated and non-magnetic materials removed. The sintered mixture is screened to result in a final size distribution of about 15 to 120 μm median, by weight particle diameter. The resulting composition comprises the metal oxide and ferric oxide in the primary phase and sometimes a small percentage (i.e., 0.5 to 3.0 percent) of the sintering agent in an intergranular phase.

To form a developer composition, the carrier composition can be coated or blended with between about 0.05 to 5 percent of a toner composition comprising a resin and a colorant. Adherence can be accomplished by heating, mechanical impaction or electrostatic attraction. For example, the carrier composition can be provided as above, and a mixture of the carrier composition and the toner composition heated to a temperature of about 100° C. to 250° C., for 10 to 60 minutes to melt and fuse the resin followed by cooling the obtained developer composition.

Typically, the toner composition includes a binding resin and a colorant. Exemplary binding resins include gum; copal; gum sandarac; rosins; homopolymers of styrene and its substituted derivatives such as polystyrene, poly-p-chlorostyrene, polyvinyltoluene; styrene copolymers such as styrene-p-chlorostyrene copolymer, styrene-propylene copolymer, styrene-vinyl toluene copolymer, styrene-vinyl-naphthalene copolymer, styrene-methyl acrylate copolymer, styrene-methyl methacrylate copolymer, styrene-ethyl methacrylate copolymer, styrene-butyl methacrylate copolymer, styrene-methyl α-chloromethacrylate, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, styrene-maleic acid half ester copolymer, and styrene-maleic acid ester copolymer; polyvinyl alcohol; polymethyl methacrylate; polybutyl methacrylate; polyvinyl chloride; polyvinyl acetate; polyethylenes; polypropylenes; polyesters; polyurethanes; epoxies; polyvinylbutyral; polyamides; polyacrylic acid resin; terpene resins; phenol resins; aromatic petroleum resins fluoropolymers, polysilanes; chlorinated paraffins; paraffins; waxes; and mixtures and blends thereof. Other suitable resins are also disclosed in U.S. Pat. Nos. 4,741,984 to Imai et al., 4,822,708 to Machida et al., and 4,879,198 to Trevernier et al., the disclosures of which are incorporated herein by reference in their entirety.

Specific polymers are as follows:

| Polymer | Tradename | Produced By |
|---|---|---|
| Polyvinylidene fluoride | Kynar | Pennwalt |
| Vinylidene chloride-acrylonitrile copolymer | Saran F220 | Dow |
| Vinylidene chloride-acrylonitrile-acrylic acid terpolymer | | |
| Cellulose nitrate | | |
| Chlorotrifluoroethylene vinylidene fluoride | Kel-F800 | 3M |
| A diphenylene sulfono | Polysulfone P-1700 | Union Carbide |
| Epoxy/amino curing agent | Epon 828/V125 | Shell/General Mills |
| Cellulose acetate butyrate | | |
| Acrylonitrile-butadiene-styrene terpolymer | Cyclopac H-1000 | Borg Warner |
| Chlorosulfonated polyethylene | Hypalon 30 | DuPont |
| A diphenylene sulfono | Polysulfone P-3500 | Union Carbide |
| Polyethylene | Epolene C | Eastman Chemical |
| Polystyrene | Polystyrene 8X | Koppers |
| Ethyl cellulose | Ethocel 10 | Herculese |
| Phenol formaldehyde | Durez 510 | Durez |
| Polyester | Dupont 49000 | DuPont |
| Polyurethane | Estane 574OX1 | Goodrich |
| Alkyl-substituted polyvinyl pyrrolidone | Ganex V816 | GAF |
| Polyvinyl formaldehyde | Formvar 7/70 | Monsanto |
| A poly-bisphenol-A carbonaic | Lexan 105 | GE |
| Alkyl-substituted polyvinyl pyrrolidone | Ganex V804 | GAF |
| Alkyl-substituted polyvinyl pyffolidone | Ganex V904 | GAF |
| Diallyl phthalate | Dapon M | FMC |
| Lucite 2041 | Methyl methacrylaic | DuPont |

See, L. B. Schein, *Electrophotography and Development Physics*, Springer-Verlag, Berlin-Heidelberg (1988).

Among them, polyvinyl alcohol, and styrene resins and acrylic resins are preferable in view of their thermal fixing characteristics, and developing durability or successive developing characteristics. The particular toner material to be employed, as will be within the skill of one in the art, depends upon the separation of the toner from treated carrier beads in the triboelectric series. These toners generally have an average particle diameter between about 1 and 30 μm.

Suitable colorants include a red pigment: red iron oxide, cadmium red, red lead oxide, cadmium, mercury sulfide, permanent red 4R, lithol red, pyrazolone red, watchung red, calcium salt, lake red D, brilliant carmine 6B, eosine lake, rhodamine lake B, alizalin lake, brilliant carmine 3B or the like; a green pigment: chrome green, chrome oxide green, pigment green B, malachite green lake, fanal yellow green G or the like; a blue pigment: prussian blue, cobalt blue, alkali blue lake, victoria blue lake, phthalocyanine blue, metal-free phthalocyanine blue, phthalocyanine blue particle chlorine compound, fast sky blue, indanthrene blue BC or the like; a magenta pigment: manganese violet, fast violet B, methyl violet lake or the like; a yellow pigment: chrome yellow, zinc yellow, cadmium yellow, yellow oxide, mineral fast yellow, nickel titanium yellow, nables yellow, naphthol yellow S, hansa yellow G, hansa yellow 10G, benzidine yellow G, benzidine yellow GR, quinoline yellow lake, permanent yellow, NCG, tartrazine lake or the like; an orange pigment: chrome orange, molybdenum orange, permanent orange GTR, indanthrene brilliant orange RK, vulcan orange, pyrazolone orange benzidine orange G, indanthrene brilliant orange GK or the like; and a black pigment: carbon black, acetylene black, lamp black, aniline black or the like. Suitable colorants are also disclosed in U.S. Pat. No. 3,989,648 to Lenhard et al. and U.S. Pat. No. 5,162,187 to Lyons et al., the disclosures of which are incorporated herein by reference in their entirety.

The developer composition can also include a charge control agent such as Nigrosine Base EX (available from Orient Kagaku K.K.), quaternary ammonium salt (P-51: available from Orient Kagaku K.K.), Nigrosine Bontron N-01 (available from Orient Kagaku K.K.), Sudatiefschwarz BB (Solvent Black 3, C.I. 26150), Fettschwarz HBN (C.I. No. 26150), Brillantspiritschwarz TN (available from Farben Fabriken Bayer A. G.), Zapanschwarz X (available from Farberke Hechist A. G.), and alkoxylated amines, alkyl amide, molybdic chelating agent and the like.

The carrier composition optionally can be coated to stabilize the resistivity and triboelectric characteristics of the carrier. For example, the carrier can be coated with a polymer coating comprising a mixture of polymers that are not in close proximity thereto in the triboelectric series such as described in U.S. Pat. No. 4,937,166 to Creatura, et al., the disclosure of which is incorporated herein by reference in its entirety. Specific examples include polyvinylidenefluoride with polyethylene; polymethylmethacrylate and copolyethylenevinylacetate; copolyvinylidenefluoride tetrafluoroethylene and polyethylene; polymethylmethacrylate and copolyethylene vinylacetate; polymethylmethacrylate and polyvinylidenefluoride, polystyrene and tetrafluorethylene; polyethylene and tetrafluoroethylene; polyethylene and polyvinly chloride; polyvinyl acetate and tetrafluoroethylene; polyvinyl acetate and polyvinyl chloride; polyvinyl acetate and polystyrene; and polyvinyl acetate and polymethyl methacrylate.

The foregoing example is illustrative of the present invention, and is not to be construed as limiting thereof.

Example

Ferric oxide and manganese oxide are mixed together to form a granulate. The free flowing mixture is then calcined in a rotary calciner until a spinel structure has been formed. Upon cooling, the calcine is contacted with water, Colloid 102 dispersant, polyvinyl alcohol binder, available from Rône-Poulenc, Foamblast 338 defoamer available from Ross Chemical and bismuth trioxide sintering aid available from Metalspecialties, Inc. The mixture is milled to approximately 1.5 microns average particle diameter. The slurry is spray dried to form free flowing spheres. These are sintered in an air atmosphere followed by a nitrogen anneal at 1090° C. to room temperature. The resulting product is deagglomerated and classified to a median, by weight, particle diameter of 50±4 μm to form the final product. The mixture has the following composition:

| Compound | Wgt % | Mole % |
| --- | --- | --- |
| $Fe_2O_3$ | 68.04 | 49.55 |
| MnO | 30.23 | 49.55 |
| $BiO_3$ | 1.74 | 0.90 |

The following is a list of properties which were achieved from the above composition of the Example:

| Ferrite Carrier Properties | |
| --- | --- |
| Property | Value |
| Sieve Analysis, Percent by Weight | |
| passing 140 mesh (106 μm) | 100.0 |
| passing 200 mesh (90 μm) | 98.1 |
| passing 400 mesh (38 μAm) | 3.47 |
| Median Diameter, μm | 48 |
| Volume Resistivity, (ohm cm) 100V | $9.2 \times 10^5$ |
| Saturation Magnetization, EMU/g | 69 |
| Apparent Density, $g/cm^3$ | 2.3 |
| BET Surface Area, $cm^2/g$ | 576 |
| passiing 230 mesh (90 μm) | 98.1 |

These properties are comparable to the properties of a manganese zinc ferrite such as "12931" available from Steward, Inc.

In the specification and examples, there have been disclosed preferred embodiments of the invention. Although specific terms are employed, they are used in a generic and descriptive sense only and not for the purpose of limitation, the scope of the invention being defined by the following claims.

That which is claimed is:

1. A method of preparing a ferrite carrier for a developer composition wherein the carrier is devoid of zinc, copper, or nickel in its crystal structure, the method comprising:
    (a) subjecting ferric oxide and a metal oxide to conditions sufficient to form a ferrite with a spinel structure;
    (b) mixing the ferrite having a spinel structure with a sintering agent; and
    (c) sintering in the liquid phase to disperse the metal oxide in the ferric oxide mixture at temperature conditions of less than about 1375° C. to provide a ferrite carrier devoid of zinc, copper, or nickel in its crystal structure.

2. A method according to claim 1 wherein step (a) comprises calcining the ferrite at a temperature of about 900° C. to 1200° C. for about 10 to 30 minutes.

3. A method according to claim 1 wherein the metal oxide is ferrous oxide.

4. A method according to claim 1 wherein the metal oxide is manganese oxide.

5. A method according to claim 4 wherein there are substantially equal molar amounts of ferric oxide and manganese oxide.

6. A method according to claim 1 wherein the sintering agent is bismuth trioxide or a frit.

7. A method according to claim 1 further including step (d) of combining the ferrite carrier with a toner composition.

8. A method according to claim 1 further including the step of coating the ferrite carrier with a polymer coating comprising a mixture of polymers that are not in close proximity thereto in the triboelectric series.

9. A method of preparing a ferrite carrier for a developer composition wherein the carrier is devoid of zinc, copper, or nickel in its crystal structure, the method comprising:
    (a) calcining a combination of ferric oxide and manganese oxide or a combination of ferric oxide and ferrous oxide at a temperature of about 900° C. to 1200° C. for about 10 to 30 minutes to provide a ferrite having a spinel structure;
    (b) mixing the ferrite having a spinel structure with a sintering agent;
    (c) spray drying the mixture of step (b) to form a powder; and
    (d) sintering in the liquid phase to disperse the metal oxide in the ferric oxide powder of step (c) at a temperature of from about 1125° C. to 1375° C. to provide a ferrite carrier devoid of zinc, copper, or nickel in its crystal structure.

10. A method according to claim 9 wherein there are substantially equal molar amounts of ferric oxide and manganese oxide.

11. A method according to claim 9 wherein the sintering agent is bismuth trioxide or a frit.

12. A method according to claim 9 further including step (e) of combining the ferrite carrier and a toner composition.

13. A method according to claim 9 further including the step of coating the ferrite carrier with a polymer coating comprising a mixture of polymers that are not in close proximity thereto in the triboelectric series.

14. A developer composition suitable for use in electrophotographic copying, the developer composition comprising a toner composition and a ferrite carrier, the ferrite carrier comprising 10 to 45 percent by weight manganese oxide and 55 to 90 percent by weight ferric oxide in a primary phase and 0.5 to 3 percent by weight bismuth trioxide in an intergranular phase.

15. A developer composition according to claim 14, wherein the toner composition comprises a binding resin and a colorant.

16. A developer composition according to claim 15, wherein the binding resin is selected from the group consisting of gum, copal, gum sandarac, rosins, homopolymers of styrene and substituted derivatives thereof, polyvinyl alcohol, polymethyl methacrylate, polyvinyl chloride, polyvinyl acetate; polyethylenes, polypropylenes, polyesters, polyurethanes; epoxies, polyvinylbutyral, polyamides, polyacrylic acid resin, terpene resins, phenol resins, aromatic petroleum resins fluoropolymers, polysilanes, chlorinated paraffins, paraffins, waxes, and mixtures and blends thereof.

17. A developer composition according to claim 15 wherein the toner composition has an average particle diameter between about 1 and 30 μm.

18. A developer composition according to claim 14, wherein the ferrite carrier has a median, by weight, particle size of about 15 to 120 μm.

19. A developer composition according to claim 14 further including a charge control coating agent.

20. A developer composition according to claim 14 having a volume resistivity of about $1.0 \times 10^5$ to $3.0 \times 10^9$ ohm cm and a saturation magnetization of about 40 to 95 EMU/g.

21. A carrier according to claim 14, wherein the carrier comprises substantially equal molar amounts of manganese oxide and ferric oxide.

22. A carrier according to claim 14, wherein the carrier has a median, by weight, particle size of about 15 to 120 μm.

23. A carrier according to claim 14 further including a polymer coating comprising a mixture of polymers that are not in close proximity thereto in the triboelectric series.

* * * * *

REEXAMINATION CERTIFICATE (3963rd)

United States Patent [19]
Smith et al.

[11] B1 5,422,216
[45] Certificate Issued Dec. 28, 1999

[54] DEVELOPER COMPOSITION AND METHOD OF PREPARING THE SAME

[75] Inventors: Danny R. Smith; James N. Kaiser, both of Chattanooga, Tenn.

[73] Assignee: Steward, Chattanooga, Tenn.

Reexamination Request:
No. 90/005,004, Jun. 1, 1998

Reexamination Certificate for:
Patent No.: 5,422,216
Issued: Jun. 6, 1995
Appl. No.: 08/204,611
Filed: Mar. 1, 1994

[51] Int. Cl.⁶ .................................................... G03G 9/10
[52] U.S. Cl. ........................................ 430/108; 430/106.6
[58] Field of Search ................................. 430/108, 106.6

[56] References Cited

U.S. PATENT DOCUMENTS

| | | |
|---|---|---|
| 2,618,552 | 11/1952 | Wise . |
| 2,846,333 | 8/1958 | Wilson . |
| 2,874,063 | 2/1959 | Greig . |
| 3,079,342 | 2/1963 | Insalaco . |
| 3,099,943 | 8/1963 | Eichorn et al. . |
| 3,590,000 | 6/1971 | Palermiti et al. . |
| 3,900,587 | 8/1975 | Lenhard et al. . |
| 3,929,657 | 12/1975 | Jones . |
| 3,989,648 | 11/1976 | Lenhard et al. . |
| 4,075,391 | 2/1978 | Berg et al. . |
| 4,192,902 | 3/1980 | Lu . |
| 4,485,162 | 11/1984 | Imamura et al. . |
| 4,618,556 | 10/1986 | Takenouchi . |
| 4,623,603 | 11/1986 | Timura et al. . |
| 4,663,262 | 5/1987 | Oka et al. . |
| 4,698,289 | 10/1987 | Aldrich et al. . |
| 4,741,984 | 5/1988 | Imai et al. . |
| 4,751,164 | 6/1988 | Katayama et al. . |
| 4,822,708 | 4/1989 | Machida et al. . |
| 4,855,205 | 8/1989 | Saha et al. . |
| 4,879,198 | 11/1989 | Tavernier et al. . |
| 4,898,801 | 2/1990 | Tachibana et al. . |
| 4,937,166 | 6/1990 | Creature et al. . |
| 4,971,880 | 11/1990 | Hotomi et al. . |
| 5,004,665 | 4/1991 | Ohtani et al. . |
| 5,116,711 | 5/1992 | Kobayashi et al. . |
| 5,124,223 | 6/1992 | Yoerger . |
| 5,149,610 | 9/1992 | Kobayashi et al. . |
| 5,162,187 | 11/1992 | Lyons et al. . |
| 5,180,649 | 1/1993 | Kukimoto et al. . |
| 5,182,540 | 1/1993 | Shuto et al. . |
| 5,194,356 | 3/1993 | Sacripante et al. . |
| 5,204,204 | 4/1993 | Shintani et al. . |
| 5,206,109 | 4/1993 | Anno . |
| 5,212,034 | 5/1993 | Tsuyama et al. . |
| 5,212,039 | 5/1993 | Demizu et al. . |
| 5,422,216 | 6/1995 | Smith et al. . |
| 5,466,552 | 11/1995 | Sato et al. ........................ 430/108 |
| 5,798,198 | 8/1998 | Sukovich et al. .................. 430/109 |

FOREIGN PATENT DOCUMENTS 200551  9/1986  Japan .

OTHER PUBLICATIONS

*Inorganic Materials* vol. 8, No. 3, Mar., 1972, "Effect of Synthesis Conditions on the Magnetic Properties of Polycrystalline Li–Ferrite," K.D., Dugar–Zhabon, pp. 439–442.

*IEEE Transactions on Magnetics* vol. Mag. 8, No. 1, Mar. 1972, "Fabrication and properties of Microwave Lithium Ferrites," Baba et al., pp. 83–93.

*Soviet Powder Metallurgy and Metal Ceramics* No. 10, Oct. 1970, "Sintering of Lithium Ferrites with Fluxes," Glotov, pp. 805–808.

"Liquid Phase Sintering" by Randall M. German, Plenum Press—1985 (Chapter 1).

"Powder Metallurgy Science" 2nd Edition by Randall M. German 1984 (Excerpts).

Engineered Materials Handbook vol. 4 "Ceramics and Glass," pp. 285–290 (1991).

"Soft Ferrite and Applications," F. C. Snelling, 2nd Ed. 1988, pp. 10, 13–14.

*Primary Examiner*—John L Goodrow
*Attorney, Agent, or Firm*—Needle & Rosenberg, P.C.

[57] ABSTRACT

A method for preparing the carrier for a developer composition is provided. The method comprises subjecting a ferric oxide and metal oxide to conditions sufficient to form a ferrite have a spinel structure, mixing the ferrite having a spinel structure with a sintering agent, and sintering in the liquid phase the mixture at temperature conditions of less than about 1375° C. to provide a ferrite carrier devoid of zinc, copper, or nickel in its crystal structure. The ferrite carrier cab be used in a developer composition comprising the ferrite carrier and a toner composition.

ବ1 5,422,216

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 14 and 20 are determined to be patentable as amended.

Claims 2–8, 10–13, 15–19 and 21–23, dependent on an amended claim, are determined to be patentable.

New claims 24–48 are added and determined to be patentable.

1. A method of preparing a ferrite carrier for a developer composition wherein the carrier is devoid of zinc, copper, or nickel in its crystal structure, the method comprising:
   (a) subjecting *a ferrite-forming composition consisting essentially of* ferric oxide and a metal oxide *selected from the group of manganese oxides, iron oxides, cobalt oxides, magnesium oxides and mixtures thereof* to conditions is sufficient to form a ferrite with a spinel structure, *which ferrite is devoid of zinc, copper, and nickel;*
   (b) mixing the ferrite having a spinel structure with a sintering agent; and
   (c) sintering the mixture in the liquid phase to disperse the metal oxide in the mixture at temperature conditions of less than about 1375° C. to provide a ferrite carrier [devoid of zinc, copper, or nickel in its crystal structure] *for a developer composition and having a saturation magnetization of 40 to 95 EMU/g.*

9. A method of preparing a ferrite carrier for a developer composition wherein the carrier is devoid of zinc, copper, or nickel in its crystal structure, the method comprising:
   (a) calcining a [combination of] *ferrite-forming composition consisting essentially of*
      (i) ferric oxide and manganese oxide or a (ii) ferric oxide and ferrous oxide at a temperature of about 900° C. to 1200° C. for about 10 to 30 minutes to provide a ferrite having a spinel structure, *which ferrite is devoid of zinc, copper, and nickel;*
   (b) mixing the ferrite having a spinel structure with a sintering agent;
   (c) spray drying the mixture of step (b) to form a powder; and
   (d) sintering in the liquid phase to disperse the metal oxide in the ferric oxide powder of step (c) at a temperature of from about 1125° C. to 1375° C. to provide a ferrite carrier [devoid of zinc, copper or nickel in its crystal structure] *having a saturation magnetization of 40 to 95 EMU/g.*

14. A developer composition suitable for use in electrophotographic copying, the developer composition comprising a toner composition and a ferrite carrier, the ferrite carrier comprising 10 to 45 percent by weight manganese oxide and 55 to 90 percent by weight ferric oxide in a primary phase and 0.5 to 3 percent by weight bismuth trioxide in an intergranular phase, *said ferrite carrier having a saturation magnetization of 40 to 95 EMU/g and being devoid of zinc, copper or nickel in its crystal structure.*

20. A developer composition according to claim 14 having a volume resistivity of about $1.0 \times 10^5$ to $3.0 \times 10^9$ ohm cm [and a saturation magnetization of about 40 to 95 EMU/g].

*24. A method for preparing a developer composition comprising:*
   *(a) subjecting a ferrite-forming composition consisting essentially of ferric oxide and a metal oxide selected from the group consisting of manganese oxides, iron oxides, cobalt oxides, magnesium oxides, and mixtures thereof, to conditions sufficient to form a ferrite with a spinel structure, which ferrite is devoid of copper, nickel, and zinc;*
   *(b) mixing the ferrite having a spinel structure with a sintering agent.*
   *(c) sintering the mixture in the liquid phase to disperse the metal oxide in the mixture at temperature conditions of less than about 1375° C. to provide a ferrite carrier having a saturation magnetization of 40 to 95 EMU/g; and*
   *(d) combining the ferrite carrier with a toner composition so as to provide a developer composition.*

*25. The method according to claim 24 wherein step (a) comprises calcining the mixture at a temperature of about 900° C. to 1200° C. for about 10 to 30 minutes.*

*26. The method according to claim 24 wherein the sintering agent is bismuth trioxide or a frit.*

*27. A method of preparing a developer composition comprising:*
   *(a) subjecting a ferrite-forming composition consisting essentially of ferric oxide and a metal oxide selected from the group consisting of manganese of oxides, iron oxides, cobalt oxides, magnesium oxides, and mixtures thereof, to conditions sufficient to form a ferrite with a spinel structure, which ferrite is devoid of copper, nickel, and zinc:*
   *(b) mixing the ferrite having a spinel structure with a sintering agent;*
   *(c) sintering the ferrite in the liquid phase to disperse the metal oxide in the mixture at a temperature of less than about 1375° C. to provide a ferrite carrier having a saturation magnetization of 40 to 95 EMU/g; and*
   *(d) coating the ferrite carrier with a polymer coating comprising a mixture of polymers that are not in close proximity thereto in a triboelectric series.*

*28. The method according to claim 27 further comprising step (e) combining the ferrite carrier with a toner composition so as to produce a developer composition.*

*29. The method according to claim 27 wherein step (a) combines calcining the mixture at a temperature of about 900° C. to 1200° C. for about 10 to 30 minutes.*

*30. The method according to claim 27 wherein the sintering agent is bismuth trioxide or a frit.*

*31. A method of preparing a ferrite carrier comprising:*
   *(a) subjecting a ferrite-forming a composition consisting essentially of ferric oxide and a metal oxide selected from the group consisting of manganese oxides, iron oxides, cobalt oxides, magnesium oxides, and mixtures thereof, to conditions sufficient to form a ferrite with a spinel structure, which ferrite is devoid of copper, zinc, and nickel in its crystal structure.*
   *(b) mixing the ferrite having a spinel structure with a sintering agent;*

(c) sintering the ferrite in the liquid phase to disperse the metal oxide in the ferric oxide mixture at temperature conditions of less than 1375°; and (d) annealing the sintered product so as to provide a ferrite carrier having a saturation magnetization of 40 to 95 EMU/g.

32. The method according to claim 31 wherein step (a) combines calcining the mixture at a temperature of about 900° C. to 1200° C. for about 10 to 30 minutes.

33. The method according to claim 31 wherein the sintering agent is bismuth trioxide or a frit.

34. The method according to claim 31 further comprising:

(e) combining the ferrite carrier with the toner composition.

35. The method according to claim 31 further comprising coating the ferrite carrier with a polymer coating comprising a mixture of polymers that are not in close proximity thereto in the triboelectric series.

36. The method according to claim 31 wherein the ferrite carrier has a volume resistivity of $1.0 \times 10^5$ to $3.0 \times 10^9$ ohm cm.

37. The method according to claim 31 wherein the sintering occurs in the presence of an atmosphere containing oxygen and nitrogen.

38. The method according to claim 31 wherein the annealing is performed in an inert atmosphere.

39. The method according to claim 38 wherein the annealing is performed in the presence of nitrogen.

40. The method according to claim 38 wherein the annealing occurs at a temperature of about 1000° C. to 1100° C.

41. The method according to claim 1 wherein the ferrite carrier has a volume resistivity of $1.0 \times 10^5$ to $3.0 \times 10^9$ ohm cm.

42. The method according to claim 9 wherein the ferrite carrier has a volume resistivity of $1.0 \times 10^5$ to $3.0 \times 10^9$ ohm cm.

43. The method according to claim 24 wherein the ferrite carrier has a volume resistivity of $1.0 \times 10^5$ to $3.0 \times 10^9$ ohm cm.

44. The method according to claim 27 wherein the ferrite carrier has a volume resistivity of $1.0 \times 10^5$ to $3.0 \times 10^9$ ohm cm.

45. The method according to claim 1 wherein the sintering occurs in the presence of an atmosphere containing oxygen and nitrogen.

46. The method according to claim 9 wherein the sintering occurs in the presence of an atmosphere containing oxygen and nitrogen.

47. The method according to claim 24 wherein the sintering occurs in the presence of an atmosphere containing oxygen and nitrogen.

48. The method according to claim 27 wherein the sintering occurs in the presence of an atmosphere containing oxygen and nitrogen.

* * * * *